United States Patent [19]

Riga

[11] Patent Number: 5,301,117
[45] Date of Patent: Apr. 5, 1994

[54] METHOD FOR CREATING A THREE-DIMENSIONAL CORPOREAL MODEL FROM A VERY SMALL ORIGINAL

[76] Inventor: Giorgio Riga, 40 Somerset Pl., Palo Alto, Calif. 94301

[21] Appl. No.: 790,329

[22] Filed: Nov. 12, 1991

Related U.S. Application Data

[63] Continuation of Ser. No. 784,772, Oct. 30, 1991, abandoned.

[51] Int. Cl.⁵ .............................................. G06F 15/46
[52] U.S. Cl. .................................. 364/468; 364/474.05
[58] Field of Search .............. 364/468, 474.05, 413.19, 364/413.22; 356/376; 409/96

[56] References Cited

U.S. PATENT DOCUMENTS

| | | | |
|---|---|---|---|
| 4,404,684 | 9/1983 | Takada | 356/376 |
| 4,436,684 | 3/1984 | White | 364/413.13 |
| 4,663,720 | 5/1987 | Duret et al. | 364/413.28 |
| 4,704,686 | 11/1987 | Aldinger | 364/413.19 |
| 4,821,200 | 4/1989 | Öberg | 356/376 |
| 4,835,688 | 5/1989 | Kimura | 364/413.22 |
| 4,893,933 | 1/1990 | Neiheisel et al. | 356/376 |
| 4,894,551 | 1/1990 | Kishimoto et al. | 356/376 |
| 4,953,087 | 8/1990 | Crawford | 364/413.19 |
| 5,007,936 | 4/1991 | Woolson | 364/413.13 |
| 5,027,281 | 6/1991 | Rekow et al. | 364/474.05 |
| 5,088,864 | 2/1992 | Yanagida | 364/474.29 |

OTHER PUBLICATIONS

"Industrial Applications of Computed Tomography at Los Alamos Scientific Laboratory", Society of *Photo-Optical Instrumentation Engineers*, R. P. Kruger, G. W. Wecksung and R. A. Morris Jun. 1980.

*Primary Examiner*—Jerry Smith
*Assistant Examiner*—Jim Trammell
*Attorney, Agent, or Firm*—Lyon & Lyon

[57] ABSTRACT

A method to construct an accurate scaled model from an original too small to allow for physical measurement is disclosed, said method generally comprising the steps of determining the initial geometry of the original, analyzing the original to determine its internal structure, establishing a reference useful for quantitative measurement of the object, physically dissecting the original, recording the results of the physical dissection, and constructing the model at a desired scale based on quantitative measurements obtained from the dissection of the original.

9 Claims, 4 Drawing Sheets

METHOD FOR CREATING A THREE-DIMENSIONAL CORPOREAL MODEL FROM A VERY SMALL ORIGINAL

CROSS REFERENCE TO RELATED APPLICATIONS

This application is a continuation of applicants copending application Ser. No. 07/784,772, as filed on Oct. 30, 1991 now abandoned. The disclosure of the parent application is herein incorporated by reference.

BACKGROUND OF THE INVENTION

1. Field of the Invention

The present invention relates to a method of fabricating a scale model of an object too small to be evaluated by conventional measurement techniques. More specifically, the present invention relates to a method for constructing a high-fidelity, disassembleable corporeal model of a minuscule object where said model provides significant accuracy of the differentiated characteristics of the object with respect to shape, materials structure and materials composition.

2. Description of the Prior Art

It is often necessary or desirable to create a scaled model of a given object for purposes of analysis, testing and education. A common example is seen in the testing of aerodynamic configurations for both land and air vehicles. In order to evaluate the aerodynamics of a wing or lifting body, for example, a small scaled model is constructed in the laboratory and then subjected to wind tunnel and other similar testing. To construct such a model, the engineering specifications for the full sized object are downsized and the model fabricated via conventional processes.

In cases where a model is constructed of an object for which there exists no construction or design specifications, such as a bone or a tooth, a model is sometimes made by forming a cast or negative impression of the object. The negative impression is then used to form a model. Disadvantages with this technique reside in its exclusive application to replicate the external physical details of an object, thereby rendering it useless to construct a model in which external and internal characteristics such as material structure, composition or function may be observed and disassembled for study or analysis.

In instances where it is necessary to construct a three-dimensional model of an internal biological structure without physical invasion of the body, e.g., a prosthesis, an image of the rough external and internal details of the object may first be obtained by use of X-rays. X-ray radiographs can then be used in conjunction with information of the structure previously known to construct the model. Such a technique is disclosed, for example, in U.S. Pat. No. 4,436,684, as issued to White. Such techniques, while oftentimes sufficiently accurate to form a prosthesis, do not generally enable the generation of a model which discloses differentiated shapes, compositions, material structure and/or functionality. This limitation is due to the nature of the X-ray medium which is limited to providing an image of materials which differ in their absorption coefficient to X-rays. Accordingly, only materials of varied density may be viewed and thus reproduced by such a method. Moreover, X-rays are generally useless to define details in objects which prevent the passage of X-rays, e.g., shielded or metallic objects.

Techniques heretofore used to construct a conceptual model of microscopic and especially submicroscopic objects such as molecules, living cells, minute electronic structures and the like, have relied upon crude approximations of their external shape. As a consequence, such models provide no more than a general representation of the characteristics of a given object and are therefore useless for purposes of quantitative evaluation.

SUMMARY OF THE INVENTION

The present invention addresses the above and other disadvantages of prior modeling techniques by providing a method to construct a scaled model of an object too small to be susceptible to conventional evaluation techniques, where such model accurately portrays the external and internal characteristics of the object.

The present invention generally involves a series of sequential steps including: (1) characterizing the object to differentiate external and internal shapes, elemental compositions, material structures and individual component functionality; (2) evaluating the object to determine the frequency of reoccurring differentiated characteristics; (3) establishing a reference appropriate for quantitative measurement of both internal and external characteristics of the object; (4) cross-sectioning the object at the desired frequency; (5) recording the results of the dissection via photographic or other imaging techniques; (6) obtaining quantitative measurements of the internal and external characteristics of the object; and (7) constructing the model.

The chief advantage offered by the method of the present invention is realized in the ability to construct an accurate model of microscopic or even submicroscopic objects which possess unknown internal or external characteristics.

Another advantage of the present invention is the ability to portray the differentiated characteristics of the object as to shape, materials structure, composition and/or function. Yet another advantage is realized in the ability to form a model which may be disassembled for closer empirical evaluation of one or more of its characteristics.

Other advantages of the invention will become apparent from the following detailed description made in conjunction with the accompanying drawings.

DESCRIPTION OF THE PREFERRED EMBODIMENT

The present invention is directed to a process comprised of a series of steps whereby a microscopic or submicroscopic object may be faithfully reproduced in a disassembleable model which distinguishes between the individual internal and external characteristics of the object. As used herein, the term "characteristics" refers to the physical shape of the object and its subcomponents; the elemental composition of the object; the various molecular structures of the object; and the functionality of the object. Accordingly, the process of the present invention enables the construction of a model which differentiates each or some of these characteristics.

Figure 1:
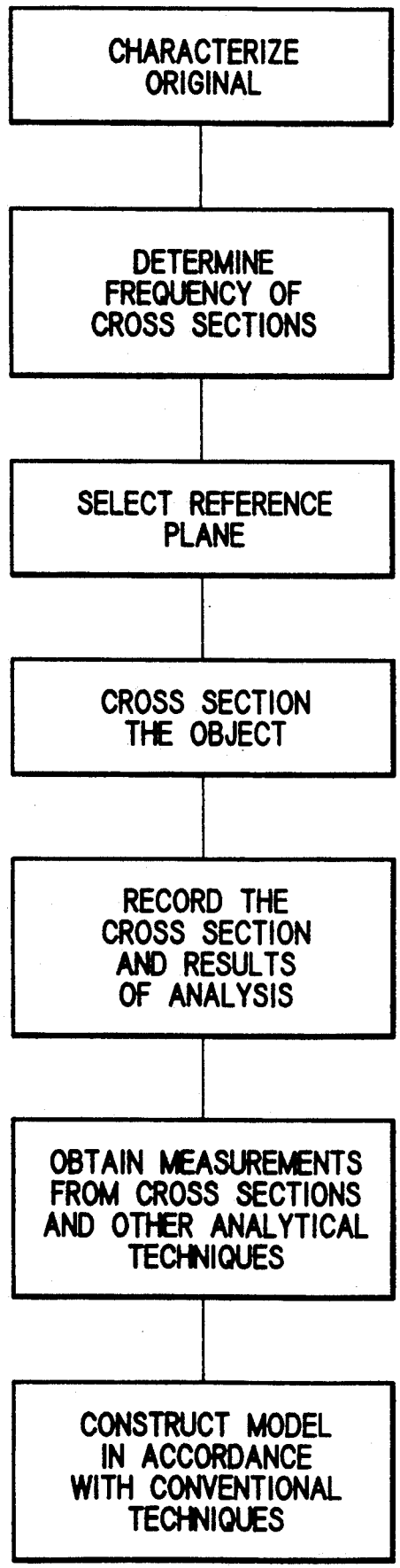
FIG. 1 schematically illustrates the steps of a preferred embodiment of the method of the present invention.
Figure 2:
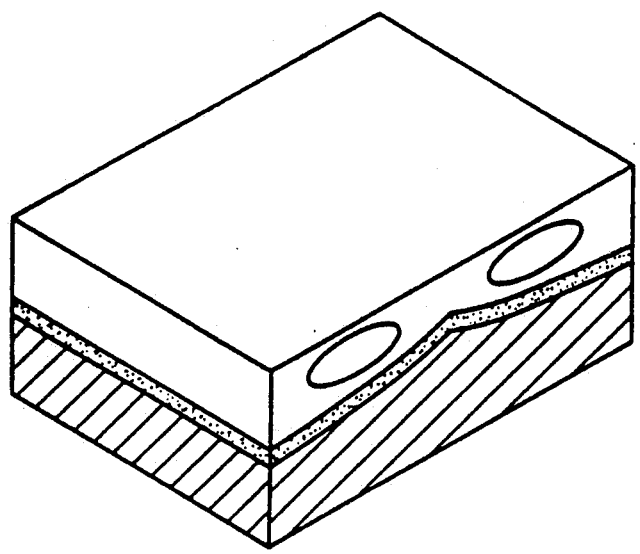
FIG. 2 is a diagrammatical representation of an MOS transistor for which a model is made in accordance with the process of the present invention.
Figure 3:
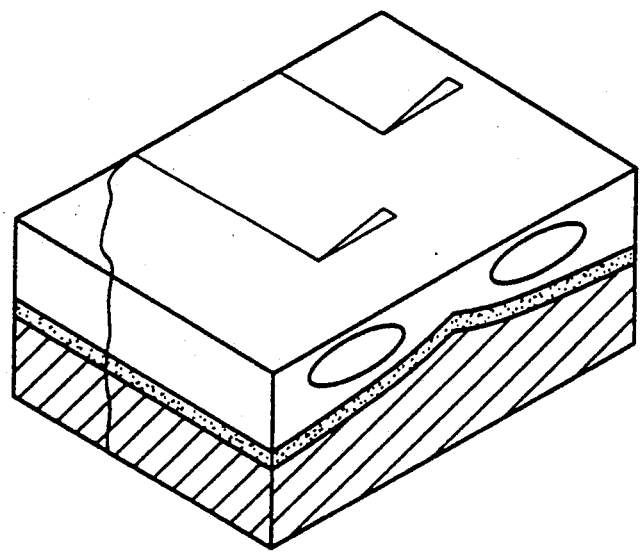
FIG. 3 diagrammatically represents a preliminary analysis of the transistor of FIG. 2 which was conducted to differentiate the characteristics of interest.
Figure 4:
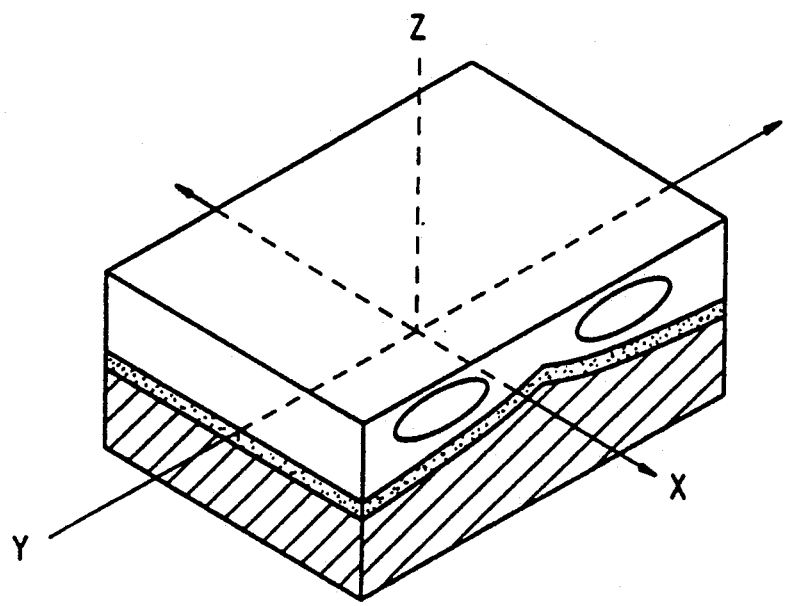
FIG. 4 diagrammatically represents a reference axis which has been chosen to evaluate the transistor.
Figure 5:
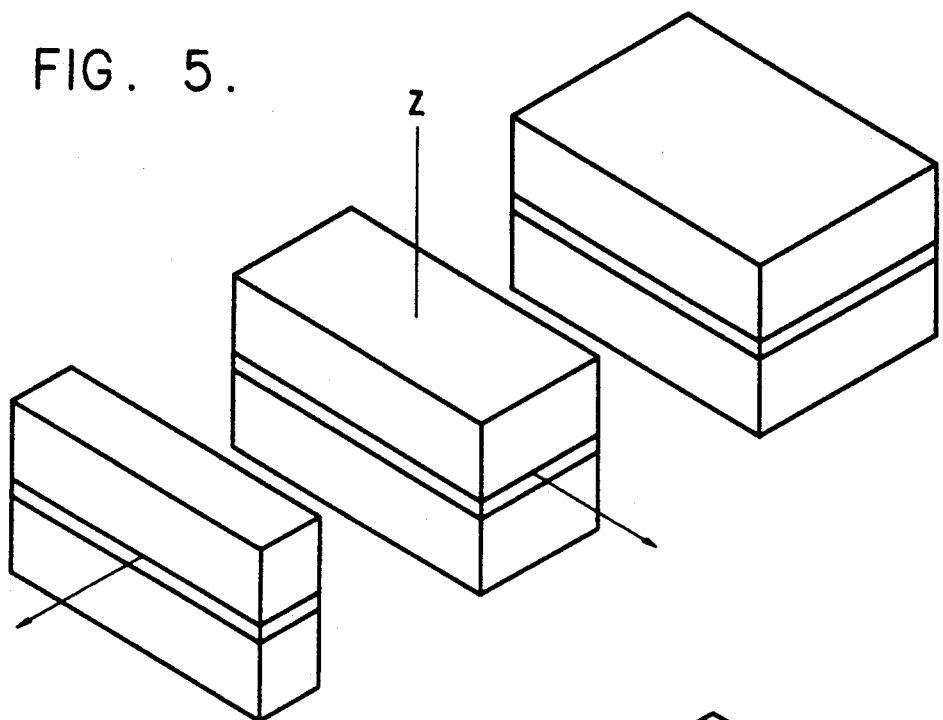
FIG. 5 diagrammatically represents the manner in which the transistor is cross-sectioned in order to obtain the measurements necessary to construct the model.
Figure 6:
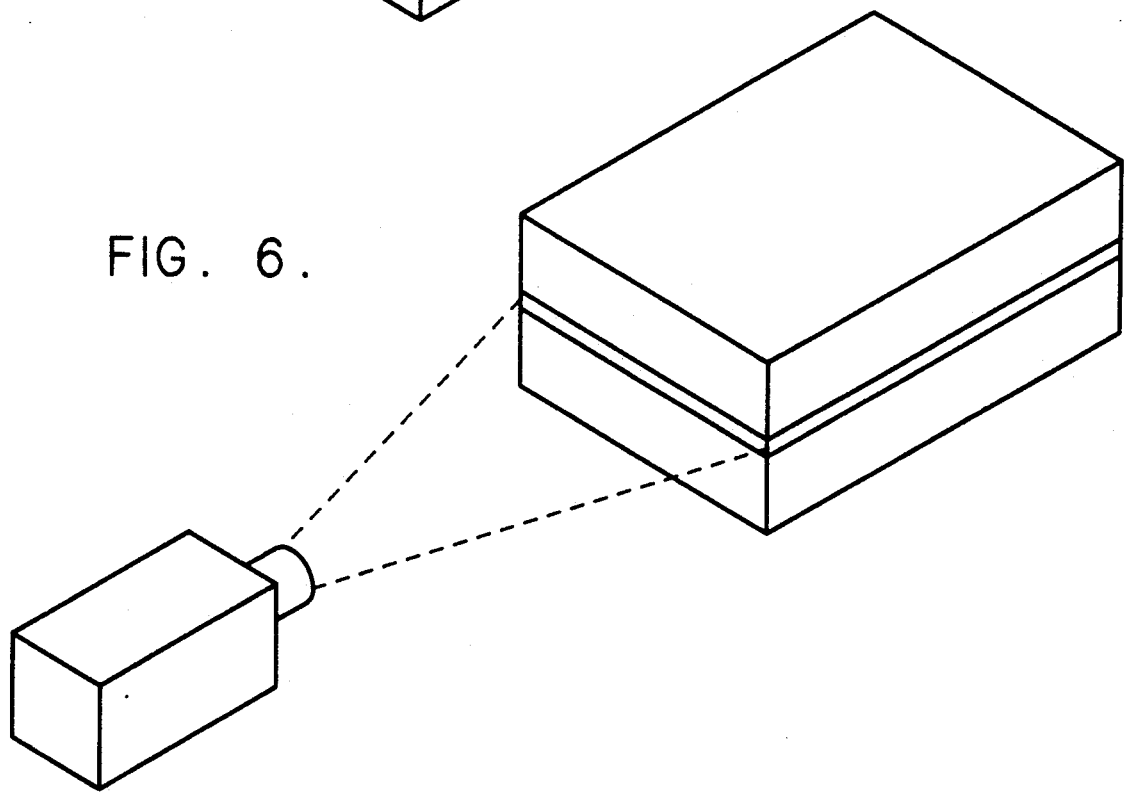
FIG. 6 diagrammatically represents the steps by which the information revealed in the cross-sectioning step is recorded.
Figure 7:
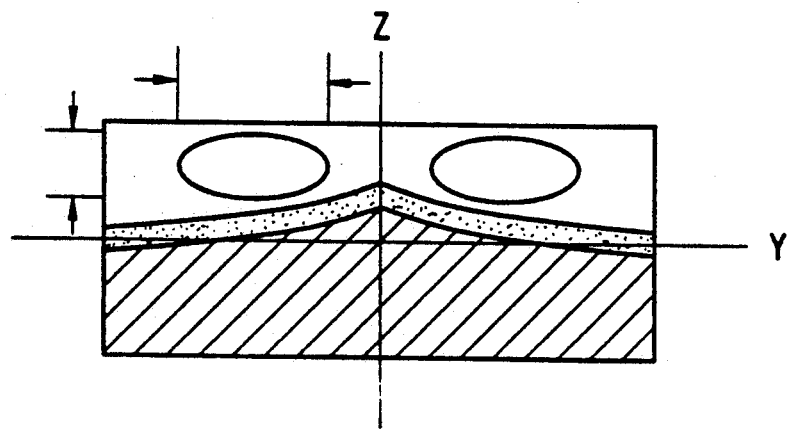
FIG. 7 diagrammatically represents the quantification of the various characteristics of the object.
Figure 8:
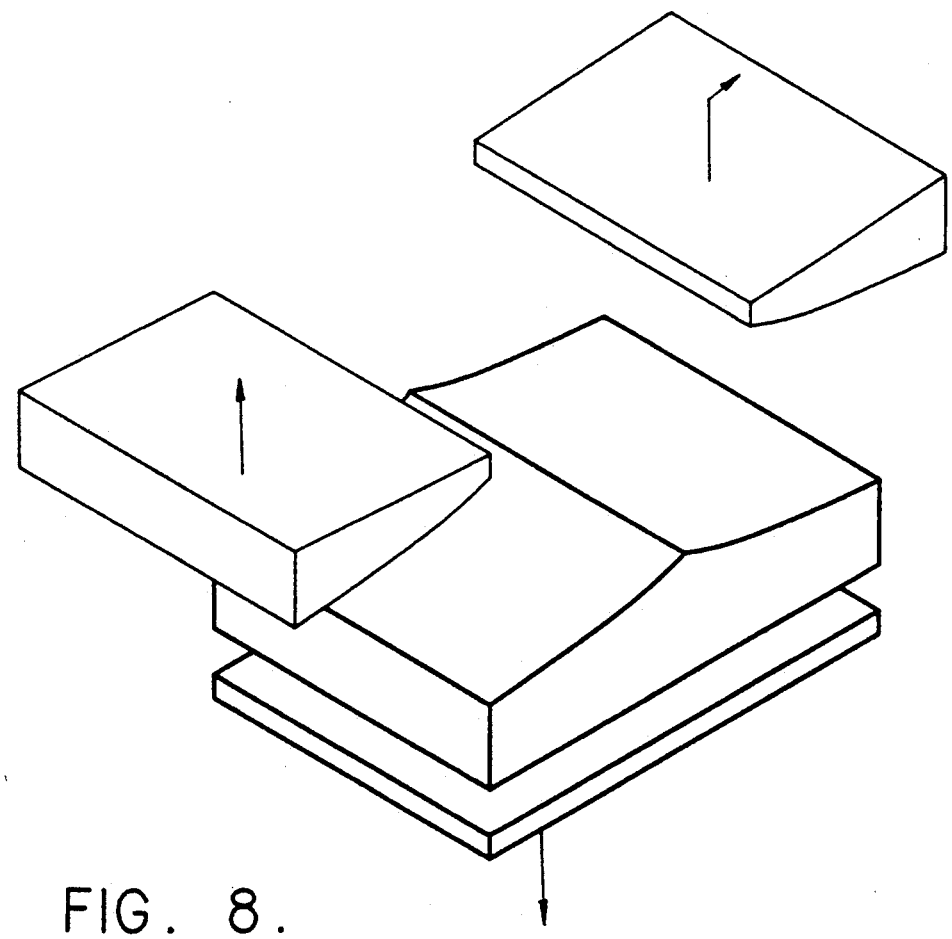
FIG. 8 diagrammatically represents the completed model which is disassembleable in accordance with variations in material structure and function.

The fundamental steps necessary to practice the process of the present invention are represented in FIG. 1 as comprising: (1) characterizing the original object; (2) determining the frequency of physical dissection necessary to accurately evaluate the desired characteristic(s) of the object; (3) selecting a reference plane based on the position of the differentiated characteristic(s) of interest; (4) dissecting the object at the selected frequency; (5) recording the results of the dissection procedure; (6) obtaining measurements from the dissection procedure; and (7) constructing the model.

Each of the individual steps set forth in FIG. 1 may not be uniformly utilized or progress in necessarily the same order in every case. Variables which may effect the utilization and order of these steps include the knowledge already available about the specific characteristics of the object to be replicated. Generally speaking, however, FIG. 1 represents a preferred embodiment of the various steps comprising the present invention.

By reference to FIG. 1, the first step of the present invention involves "characterizing" the object. Characterizing as used herein refers to the analysis of the individual characteristics of the object, which, as identified above, includes the object's shape, composition, materials structure and function. Characterizing the object itself includes a number of substeps which may or may not be necessary in a given case depending on the characteristics to be emphasized in the final model. In this connection, it is anticipated that it will not always be necessary or desired in the final model to include each of the four characteristics defined above.

The first substep involves an analysis of the general external geometry of the object, i.e., spherical, tetrahedral, plasmatic, fibrous, etc. This may be accomplished, for example, by visualizing the object through an optical or electron microscope. In most cases, however, this substep will be unnecessary since the object will already have a known external shape.

The second substep involved in characterizing the object includes a determination of the degree of reproduction, accuracy and detail required in the final model. In some instances, it may be desirable to construct a model which is physically accurate as to both internal and external detail, but does not differentiate on the basis of chemical composition, material structure or function. In instances where a model of a living cell is desired, it may alternately be desirable to construct a model which chemically differentiates between each of the individual subcomponents. In the case of a microelectronic component, it may be desirable to differentiate between the individual crystal structures and their associated functions. Though the emphasis in each case may vary, it is contemplated that it will be desirable in each case to construct a disassembleable model.

The last substep in characterizing the object involves an analysis of the object to determine the preferred technique to obtain quantitative and qualitative information necessary to construct the model. Again, the method of this analysis will vary depending on both the object of study and the objective of the final model. For example, if the object comprises an integrated circuit and a model is desired which differentiates between the crystalline and polycrystalline structures, it may be desirable to cross-section the object and then employ an etching solution which will reveal the differentiated structures under an electron microscope. If the object comprises a biological structure, e.g., a pollen grain, and it is desired to construct a model faithful to both internal and external shapes, it may be desirable to cross-section the object in a variety of planes and then review the cross-sections under an optical or scanning microscope. If the object is known to be comprised of a series of concentric shells of material varying in chemical composition, it may be desirable to chemically strip away these individual shells to reveal the next concentric structure. As may be apparent, one or more of the above and other processes may be used in a given occasion dependent upon the objectives of the model.

The next step generally entails a physical analysis of the results of the characterizing steps identified above in order to determine the frequency of reoccurring undifferentiated characteristics in the object. This is necessary to correctly evaluate the position of the reference as will be discussed below, as well as the frequency of the individual cross-sections. If the objective of the model is to merely reproduce the internal and external shape of the object and the object is possessed of only three layers of material which are evenly distributed in a linear fashion, the frequency of the cross-sections will be greatly reduced. If, however, such a model were to be produced of a microscopic organism, e.g., a paramecium, the frequency of the cross-sections would be considerably larger due to the greater number of differentiated, non-repetitive structures.

To further elaborate on this step, the frequency of the individual cross sections will be determined as both a function of the accuracy required of the completed model and the objective of the modeling study. In an example where the subject of interest involves a three layered submicroscopic object where the second or middle layer is deposited in a series of rings about an axis, and a disassembleable model is desired which accurately details the physical structure and interrelationship of the layers, it will be desirable to cross section the object in a plane perpendicular to the rings at a frequency enabling a determination of the thickness and width of each ring. This may entail a series of cross sections oriented parallel to the x and y axes. Ideally, it would be desirable to perform a minimum number of cross sections which would be necessary to locate and plot the axis defined by the rings. When the axis is found, a single cross section parallel to both the x and y axes will enable the physical structure of the rings to be determined, assuming that the individual rings possess uniform thickness and width. If, however, the rings are irregular in shape, width or thickness, it will be necessary to increase the frequency of the cross sections through each of the rings to establish their physical configuration. This is a function of the extent of change in the slope of the external surfaces of each ring. In general, the greater the change in the slope of the external or internal surfaces, the greater the frequency of cross sections which will be required in each case. If, for example, each ring possesses a stepped external surface, it will be necessary to establish a cross section both before and after each "step" in order to determine the relative position of the step as well as the amplitude of the step along the z axis. If, however, the ring describes an irregular yet gradually modulating shape, it will be necessary to cross section only as often as necessary to determine the slope or gradient of the external surfaces of each ring. This may be determined by moving along the x or y axis until a quantifiable variation along the z axis is discovered. If this variation describes a generally linear pattern, the amplitude revealed as a result of each cross section may be recorded and a line therebetween may be plotted. To facilitate the aforedescribed cross sectioning process, it may be desirable to use a supplemental stripping or etching technique to remove either the first or third layer so as to enable the shape and relative orientation of the rings to be ascertained.

Aside from the method described above, the frequency of cross-section can also be determined by the change or variation of molecular stucture, composition or functionality to be reproduced in the object of study.

Once the object has been "characterized" as identified above, and the frequency of the cross-sections has been determined, a reference axis or plane must then be established from which quantitative and qualitative measurements of the various shapes and structures may be obtained. This step necessarily follows the first two steps described above in which a general knowledge of the external and internal characteristics of the object was gathered.

In most instances, this reference will comprise a plane situated at or proximate to a natural differentiation in the shape, structure, or composition of the object. In the example involving the integrated circuit, the reference plane may be situated at the interface of the crystalline and amorphous regions. In the example involving the pollen grain, a reference axis may be chosen along the long axis of the pollen grain or, in the event of a spherical grain, the geometric center of the grain may be used as the intersection of the x, y and z axes in a Cartesian coordinate system. Depending on the object of study, it may be desirable to use one or more references in a given case.

As noted, the selection of the appropriate reference will vary depending on the characteristic(s) to be emphasized in the model. It is preferred, however, that the reference, e.g., the reference plane, be also positioned in a way to facilitate the construction of the model itself.

The method of the present invention usually requires physical dissection of the object to be replicated. Physical dissection is generally necessary to enable the precise measurement and relative location of the internal and external characteristics of the object, e.g., shape, composition, materials structure and function. In some cases, however, other noninvasive techniques, e.g., radiographs can also be used to obtain the physical information necessary to build the model. Once the frequency and nature of the dissection or other procedure has been ascertained as discussed above, the object is dissected along or in accordance with a Cartesian or polar coordinate system based on the position of the reference point, axis or plane. In most cases, the object will be cross-sectioned. This may be accomplished in accordance with conventional techniques such as cleaving, mechanical polishing, Focussed Ion Beam cross-section (FIB) or microtomy. Depending on the nature of the object and the focus of the model, these cross-sections may be performed in a variety of intersecting planes. In a Cartesian system, it is expected that these cross-sections will be made along the x, y and z axes.

Once a series of cross-sections have been obtained in accordance with the desired frequency as described above, the images of the cross-sections are magnified and subjected to further analysis so as to allow for relative measurement of internal and external characteristics. The extent of this magnification and analysis is a function of both the focus of the model, as well as the accuracy and scale desired in the final product. The magnified images are captured via conventional photographic techniques, or are the product of more exotic techniques such as X-ray Energy Dispersive (XED), Auger Electron Spectroscopy (AES), Secondary Ion Mass Spectroscopy (SIMS), Resistivity or Spreading Resistance Dot Map (SRP), Atomic Force Microscopy (AFM), and Scanning Tunneling Microscopy (STM).

The next successive step involves obtaining measurement from the images obtained as a result of the above techniques. These measurements may be obtained manually from the images noted above. In a preferred embodiment, however, the images obtained above are fed directly into a computer and the internal and external surfaces digitized whereby automatic measurements may be obtained.

From these dimensions, a model may be constructed by any of a number of techniques, including conventional methods using templates and scaled mockups, or more sophisticated techniques such as computer controlled machining or stereolithography.

EXAMPLE 1

A model was constructed of an MOS transistor in accordance with the process of the present invention as described above. It was an object of the modeling process to reproduce the relative positioning of the nine layers comprising the transistor including: (1) a P substrate; (2) a $N^+$ a $N^-$ arsenic and phosphorus doped layer; (3) $SiO_2$ gate; (4) a phosphorus-doped polysilicon gate; (5) $SiO_2$ spacers; (6) an intermediate dielectric phosphorus-doped $SiO_2$ layer; (7) a boron phosphorus-doped $SiO_2$ layer; (8) a contact layer comprised of three sublayers of Ti/Al/Ti; and (9) a top protection layer.

The transistor was known to possess a generally rectangular geometry having external dimensions of approximately 5.5 microns by 3.5 microns in the x and y planes. It was desired to construct a model scaled to 1:80,000. It was further desired to produce a model that faithfully reproduced the relative size, shape and composition of the different components of the transistor as identified above.

It therefore was necessary to characterize the transistor based on the various material structures and composition, e.g., crystalline, polycrystalline silicon doped and undoped regions and insulating and conductive layers, comprising the transistor. In order to accomplish this, the transistor was first subjected to a selective and sequential stripping process in order to remove each layer. This stripping process was accomplished by both dry and wet etching. The material analysis was performed at the appropriate location utilizing a combination of techniques: X-Ray Energy Dispersive (XED), Auger Electron Spectroscopy (AES), Secondary Ion Mass Spectroscopy (SIMS), Spreading Resistance (SRP) and Transmission Electron Microscopy (TEM).

Based on the results of the sequential stripping, it was determined that the modeling process would require three or four cross-sections cut in intersecting directions. For sake of simplicity, a reference plane was chosen to run along the boundary of the P substrate doped regions and all upwardly progressive layers. This plane was desirable since the silicon-silicon dioxide interface represented the flattest and largest subcomponent of the object and would furthermore represent a convenient baseline for the modeling process. This reference plane was adapted to Cartesian coordinates, and was defined by the intersection of the x and y axes. The transistor was then cross-sectioned in accordance with the frequency noted above in the x and y planes. These cross-sections were prepared by physical polishing of the transistor to a desired location.

These cross-sections were again analyzed by XED and AES to better locate the position and the chemical composition of some These cross-sections were again analyzed by XED and AES to better locate the position and the chemical composition of some of the layers. The cross-sections were again selectively etched to reveal the location of the different materials e.g., crystalline and polycrystalline layers.

Once these cross-sections had been prepared and analyzed in this fashion, the cross-sections were photographed via a high resolution scanning electron microscope which was provided with a measurement scale. This scale allowed the individual layers to be manually measured and relatively positioned with respect to each other.

From these measurements, a two dimensional scaled drawing was made from the photographic images of each of the cross sections, which in this case included cross sections in the x and y planes. A series of templates were constructed of each component of interest from each of the cross sections as earlier described. These templates accurately replicated the dimensions of the different components of the transistor at the planes defined by the cross sections.

These templates were assembled at the frequency of the cross sections to form a skeleton which was filled in with a clay or plastic solution to form a solid body or mockup of the transistor and its individual components. From this mockup a negative mold was formed of the individual components of interest in the modeling study. From this negative mold a rough cast of the each component was formed. This cast was subsequently subjected to both coarse and fine finishing steps to improve the accuracy of each the external structure of each component as well as to improve the fit between each component structure in the disassembleable model.

While certain specific and preferred embodiments of the present invention have been illustrated herein, it will be understood that still further variations and modifications can be made therein without departing from the spirit and scope of the invention as claimed below.

I claim:

1. A method of fabricating a three-dimensional corporeal model from a very small original object exhibiting differentiated characteristics, undifferentiated characteristics, or a combination of differentiated and undifferentiated characteristics, the undifferentiated characteristics reoccurring at a determinable frequency, said method comprising the steps of:
    (a) characterizing the original object;
    (b) determining the determinable frequency of selected reoccurring undifferentiated characteristics in the original object;
    (c) selecting a reference position from which to dissect the original object;
    (d) dissecting the original object at specified locations selected relative to said reference position and at a specified frequency which is generally inversely proportional to the determined frequency of the selected reoccurring undifferentiated characteristics in the original object, thereby creating cross-sections at each of said specified locations;
    (e) recording said cross-sections of said reoccurring undifferentiated structures;
    (f) obtaining measurements of the differentiated characteristics, undifferentiated characteristics or combination of differentiated and undifferentiated characteristics associated with the original object at said cross-sections; and
    (g) scaling said measurements by a predetermined factor to provide data for constructing the three-dimensional corporeal model.

2. The method of claim 1 wherein the characterizing steps includes the substeps of:
    (a) determining the external geometry of the original object;
    (b) determining a degree of detail with which the three-dimensional corporeal model will be characterized; and
    (c) performing an invasive physical analysis of the original object to reveal the differentiated and undifferentiated characteristics which exist in the original object.

3. The method of claim 2 wherein said substep of performing said invasive physical analysis is carried out by physical cross-sectioning, sequential stripping or successive replications.

4. The method of claim 1 where the reference includes a reference point, axis or plane.

5. The method of claim 1 wherein the cross-sections are recorded via Scanning Electron Microscopy, Transmission Electron Microscopy, X-ray Energy Dispersive, Auger Electron Spectroscopy, Secondary Ion Mass Spectroscopy, Resistivity Dot Map, Atomic Force Microscopy or Scanning Tunneling Microscopy.

6. The method of claim 1 wherein the model is constructed via computer imaging.

7. A method of forming a three-dimensional model from a microscopic or submicroscopic object, comprising the steps of:
    (a) scanning the object to determine its external geometry;
    (b) analyzing the object through physical, chemical, electrical or other means to achieve a general determination of its internal shape, structure, composition and/or function;
    (c) determining one or more reference planes appropriate for quantitative measurement of the object as based on the results of (a) and (b);
    (d) cross-sectioning the object along the reference planes in accordance with frequency of reoccurring undifferentiated characteristics of interest, thereby creating cross-sections;

(e) documenting results of the cross-sectioning so as to enable quantitative measurement of said characteristics; and
(f) constructing the model based on the quantitative measurements.

8. The method of claim 7 wherein the cross sections are documented photographically.

9. The method of claim 7 wherein the cross sections are documented via Scanning Electron Microscopy, Transmission Electron Microscopy, X-ray Energy Dispersive, Auger Electron Spectroscopy, Secondary Ion mass Spectroscopy, Resistivity Dot Map, Atomic Force Microscopy or Scanning Tunneling Microscopy.

* * * * *